ize>

United States Patent [19]
Youngquist

[11] Patent Number: 5,500,602
[45] Date of Patent: Mar. 19, 1996

[54] STORM MONITOR

[76] Inventor: John S. Youngquist, 899 Niagara Blvd., Ft. Erie, Ontario, Canada

[21] Appl. No.: 404,896

[22] Filed: Mar. 15, 1995

Related U.S. Application Data

[62] Division of Ser. No. 115,183, Aug. 31, 1993, Pat. No. 5,408,175, which is a division of Ser. No. 708,487, May 31, 1991, Pat. No. 5,245,274.

[51] Int. Cl.$^6$ ..................................................... G01W 1/16
[52] U.S. Cl. ............................................. 324/72; 324/202
[58] Field of Search ................................ 324/72, 202, 77; 343/701

[56] References Cited

U.S. PATENT DOCUMENTS

| | | | |
|---|---|---|---|
| 3,715,660 | 2/1973 | Rubnke | 324/72 |
| 4,023,408 | 5/1977 | Ryan et al. | 73/170 |
| 4,084,135 | 4/1978 | Enabnit | 324/202 |
| 4,115,732 | 9/1978 | Krider et al. | 324/72 |
| 4,198,599 | 4/1980 | Krider et al. | 324/72 |
| 4,219,805 | 8/1980 | Magee et al. | 324/204 |
| 4,383,260 | 5/1983 | Ryan et al. | 343/701 |
| 4,395,906 | 8/1983 | Ryan et al. | 73/170 |
| 4,639,666 | 1/1987 | Strosser et al. | 324/202 |
| 4,803,421 | 2/1989 | Ostrander | 324/72 |
| 4,831,362 | 5/1989 | Tsaprazis | 324/202 |
| 4,873,483 | 10/1989 | Ostrander | 324/72 |

OTHER PUBLICATIONS

L & T Report 202 "Atmospheric Static Investigation", Mar., 1952, pp. 16–20.
L & T Laboratory Report No. 280, completed Dec., 1951, pp. 13–73.

Primary Examiner—Kenneth A. Wieder
Assistant Examiner—Mark Wardas
Attorney, Agent, or Firm—Phillips, Lytle, Hitchcock, Blaine & Huber

[57] ABSTRACT

A storm monitoring apparatus and method is described wherein two H-field antennas are oriented with respect to the heading axis of an aircraft or the like at an angle of 45°. The signals developed by these two antennas are picked-up by small R-F transformers which serve the inherent function of integrating the signals and extracting the H-field current component. A printed circuit board structuring of the two antennas provides for consistency of fabrication and reliability as well as compactness. The monitoring apparatus exhibits broad band frequency response to evaluate lightning strike rate to determine storm range and intensity. A computer control test utilizing diagnostic coils at the antenna carries out periodic testing of the performance of the device and a component such as a gravity switch provides an indication to the control system as to the orientation of mounting of the antenna on an aircraft. The outputs of the antennas are digitized and evaluated at a high rate and range information is developed from these digitized data in consequence of the transfer function of the atmosphere. For example, range is developed by an analysis of the decay of various frequency components emanating from a lightning burst. Select memory retention of the data is continuously provided such that the operator can look to immediately preceding storm evaluations to determine whether the condition in which flight is being made is one into worsening or improving weather.

5 Claims, 12 Drawing Sheets

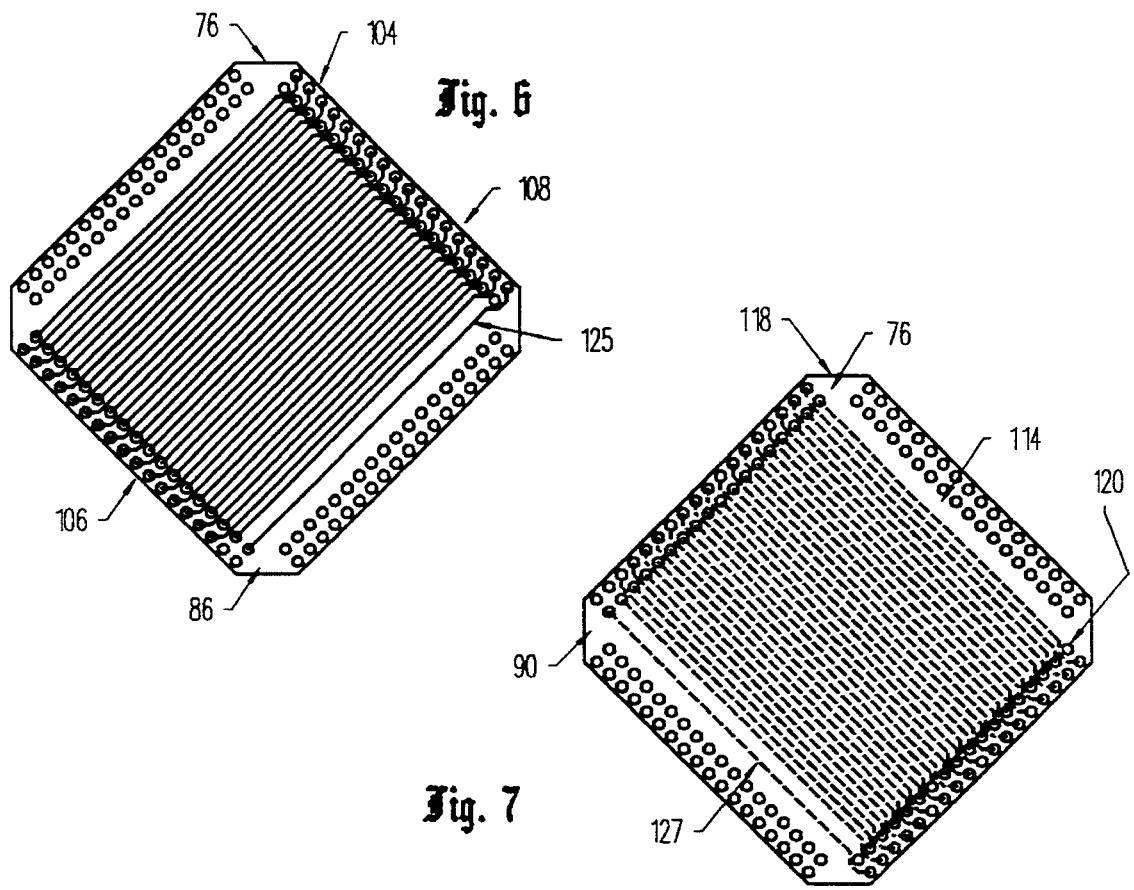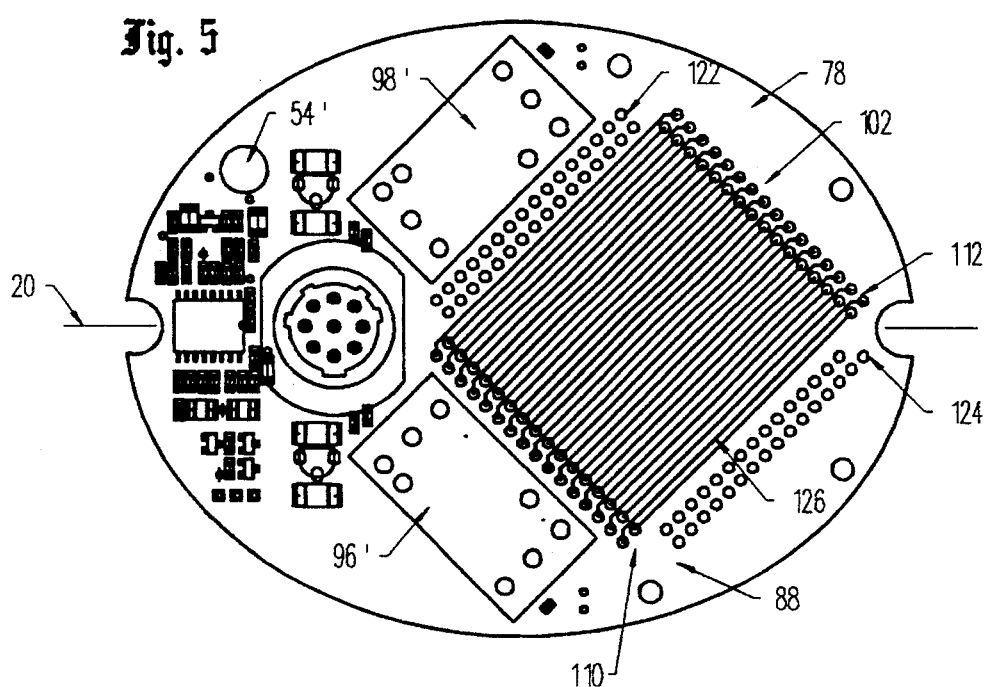

STORM MONITOR

CROSS-REFERENCE TO RELATED APPLICATIONS

This application is a division of pending U.S. patent application Ser. No. 08/115,183, filed Aug. 31, 1993, now U.S. Pat. No. 5,408,175, which was a division of then-pending U.S. patent application Ser. No. 07/708,487, filed May 31, 1991, now U.S. Pat. No. 5,245,274.

BACKGROUND OF THE INVENTION

The aircraft industry has long been concerned with the development of safe flight procedures in the presence of inclement weather. Aircraft weather monitoring instrumentation involves a variety of devices including radar- and ground-derived weather information readouts, as well as instruments performing in specific response to thunderstorm phenomena. These latter monitoring instruments are desirable inasmuch as, although radar maps rain with great accuracy, rain is not the pilot's main concern. Hazardous convective activity occurs long before any rain has fallen. Thus, it is helpful to identify thunderstorms where radar indicates nothing.

Thunderstorms have long been studied and evaluated by investigators. Some categorizations of them have been advanced as part of an analysis leading to the detection and mapping instrumentation. For example, in U.S. Pat. No. 4,023,408 by Ryan et al., issued May 17, 1977, and entitled "Stormscope", thunderstorms are classified into two basic types, the convective thunderstorm and the frontal thunderstorm. The discourse provided therein describes the development through maturity of each type of storm. In general, the storms exhibit very fast discharge phenomena which, when monitored, provides an extensive amount of data developed from strikes of a duration on the order of 100 microseconds. Thus, to fully evaluate the storms, it is important that a broad-band response be made to them. Generally, a storm-generated lightning bolt will be present as an extremely large current surge from cloud to ground. Accompanying that surge of current is a magnetic field which propagates as any radio wave for many, many hundreds of miles. With each such electromagnetic wave, there are two components, a magnetic component or H-field, and an electrostatic component or E-field. The E-field is non-directional as far as antenna evaluation thereof is concerned and thus, its influence on any antenna structure serves to contaminate directional information. Typically, the instruments heretofore developed employ a technology wherein three antennas are utilized, two being H-field antennas and a third being a E-field antenna. The latter E-field antenna has represented an unfortunate major source of noise and confusion to the circuitry of these storm monitors, inasmuch as it responds quite well to noise phenomena and thus is quite unreliable. This latter third antenna is used to resolve ambiguity which results from recourse by instruments of the past to low bandwidth performance. The use of this third antenna results, more than likely, because of its use typically in automatic direction finding devices. Such devices have typically employed a pair of cross coils and a third E-field antenna to resolve ambiguities. However, in the automatic direction finding environment, the signal monitored is continuous, whereas when this system is employed in ranging and locating thunderstorms, the signal relied upon is that emanating from the lightning strike, and thus is a mere random pulse of generally known polarity. Thus, the third, E-field antenna conventionally employed with the thunderstorm evaluating and monitoring instrumentation has represented a problematic aspect of those devices.

Conventional storm monitoring instruments have employed two orthogonally-disposed H-field coils which are formed as wire windings about a ferrite core. Such wound structures may pose difficulties in costs in assembly. This core-and-coil assemblage is then mounted within an antenna pod on the aircraft such that one coil is oriented perpendicularly with respect to the longitudinal or flight-heading axis of the aircraft. Storm-bearing information thus is developed in conjunction with aircraft bearing or heading. However, the perpendicular orientation of one of the H-field antennas with respect to heading results in storm-bearing response characteristics which are the least accurate for the aircraft heading direction. Further, the attitude of the aircraft typically evokes a vertical movement or pivoting of the antenna coils during conventional flight. This results in signal anomalies. Another aspect of this conventional H-field antenna implementation concerns its output, which is a function of the derivative of the magnetic field. Thus, integration approaches are employed which are undesirable in such measurement systems.

The aircraft environment also poses problems for storm monitoring instrumentation. Thus, testing of such equipment before flight or the installation of the equipment generally cannot evaluate the effect of the dynamic and noisy environment of an aircraft in flight. During such flight, cabling carrying antenna-derived signals will be subjected to the noise influence of aircraft heater motors, strobe light power supplies, autopilot motors and the like. This, of course, represents a highly noisy and rigorous environment to derogate the value of the signals transmitted. Installation anomalies also may occur. The antenna may be installed backwards or upside down by unskilled technicians or mechanics. Wiring to the H-field antennas may be reversed to generate just the opposite of information desired. Finally, the readout components should be of practical size and weight for instrument panel mounting. Typically, relatively long cathode ray tube (CRT)-based readout devices are employed, requiring specialized mounting due to their inherently larger bulk.

SUMMARY OF THE INVENTION

The present invention is addressed to a storm monitoring apparatus and method employing two H-field antennas which are orthogonally disposed with respect to each other, but additionally are each oriented at an angle of 45° to the line-of-flight or heading axis of the aircraft. This orientation achieves enhanced signal-to-noise performance and higher accuracy for locating storms, especially those storms positioned straight ahead of the aircraft. Further, the antennae, so oriented with respect to the aircraft line-of-flight, exhibit an immunity to aircraft attitude variations with respect to output signal generation and are employed in a manner to achieve a common mode rejection of otherwise contaminating E-field signals. This common mode rejection is developed through the employment of current-specific detectors, such as small R-F output transformers performing in conjunction with the H-field antennas. A rejection ratio on the order of 500:1 or 600:1 is achieved with the unique approach. Of additional merit, the output signals of the antennas are directly proportional to the H-field transient produced by a lightning strike due to an inherent integration achieved with detector inductance and impedance. Thus, no integration-based anomalies due to a specific integration stage are encountered with the instrumentation.

Formed utilizing printed circuit procedures encasing or enclosing a ferrite core, the antennas exhibit a consistency of performance and quality over devices produced employing coil winding procedures.

The antennas are enclosed within a low-profile aerodynamic elliptically-shaped housing formed of high-strength plastic material within which conductive material is incorporated to minimize electric field pick-up. Formed as part of a readily-reproducible circuit board assemblage incorporating a ground plane for improved avoidance of E-field contaminants, the antennas are fabricated with desirable consistency, thus promoting reliable performance. As part of this circuit board structuring, a ferrite block, representing the highest mass of the sensor structure, is restrained upon and within the circuit board arrangement in a manner securing the assemblage from damage due to the substantial vibration encountered during flight. A gravity switch within the antenna housing provides an output to the control system indicating the orientation of the antennas. Thus, should a mechanic mount the housing in a manner considered upside down, the gravity switch will accommodate that error with appropriate signals to the on-board control system.

The control system employed with the apparatus performs in conjunction with test coils and test coil drivers mounted adjacent the H-field antennas. By carrying out automatic and periodic diagnostic testing of the antennas and associated response circuitry during in-flight usage, the pilot has an assurance of reliability of performance on a substantially continuous basis. Reliability is additionally enhanced through the utilization of a built-in power supply regulator within the antenna housing, functioning to minimize interaction between the antenna and electrical equipment sharing the aircraft power supply.

The readout providing storm bearing and range location to the pilot is positioned within the aircraft cabin, a square pixel matrix, neon plasma display device being employed. In addition to exhibiting substantially reduced bulk, the matrix-based display is rotated 45° with respect to vertical to achieve an improved clarity of storm map presentation for the operator or pilot. A circularly-polarized optical filter is placed in front of this display to minimize the effects of glare. Edge illumination is provided with the display such that markings are visible under low ambient light levels, and these levels are monitored so as to optimally adjust indicia illumination. Included with the readout are push-button switching actuators which provide for gain changing through a smooth, continuous "zooming" action. Additionally, historical storm cell map data are stored in memory and may be "replayed" on a "time-lapse" basis for the operator. In the event of the automatic self-testing or self-diagnostics showing an error, an appropriate error message is published at the display.

The control system employed with the invention treats the signals deriving, inter alia, from the H-field antennas by digitizing them to develop a string of binary numbers which are stored at very high speed in memory. The thus-digitized data are examined in real time by a threshold form of circuit to determine whether the system has interest in the data as being evolved from a thunderstorm. The system then determines the strength and height of the storm based upon the strike rate examined, while range is developed in consequence of the transfer function of the atmosphere. In this regard, the frequencies developed by the broad-band system will decay within the atmosphere at different rates depending upon frequency value. By analyzing these rates of decay, range can be evolved with a high level of precision.

Other objects of the invention will, in part, be obvious and will, in part, appear hereinafter.

The invention, accordingly, comprises the apparatus, system and method possessing the construction, combination of elements, arrangement of parts and steps which are exemplified in the following description.

For a fuller understanding of the nature and objects of the invention, reference should be had to the following detailed description taken in connection with the accompanying drawings.

BRIEF DESCRIPTION OF THE DRAWINGS

FIG. 5 is a top view of the base component of a circuit board employed with the structure shown in FIGS. 2 and 3.

FIG. 6 is a partial view of a retainer and coil-supporting circuit board shown in FIGS. 2 and 3.

FIG. 7 is a view of the circuit board assemblage of FIG. 5, showing in dotted line fashion the coil structuring of its underside.

DETAILED DESCRIPTION OF THE INVENTION

Figure 1:
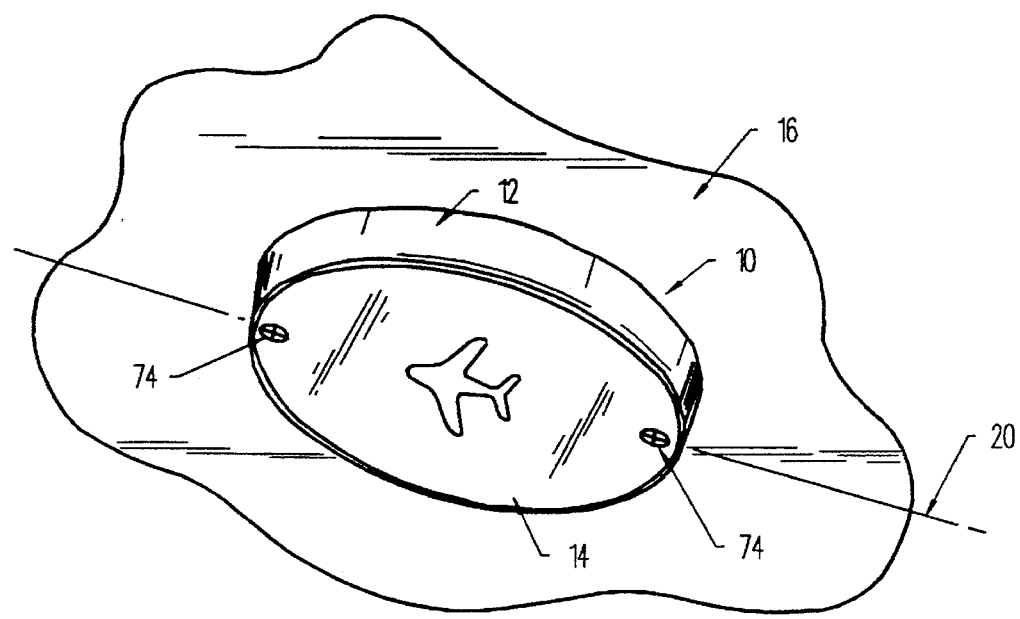
FIG. 1 is a partial perspective view of the antenna housing employed with the invention shown attached to a vehicle with which it performs, such as the underside of an aircraft.

Referring to FIG. 1, an antenna or sensor assemblage configured in accordance with the invention is revealed generally at 10. Antenna assemblage 10 includes an outer housing 12 having a cover 14 formed thereon. The housing and cover are formed of a highly impact resistant plastic material, such as nylon, which is made conductive by being impregnated, for example, with a carbon component. The device 10 is mounted, for example, on the underside of an aircraft, a portion of which is represented at 16. To align the antenna appropriately, a silhouette 18 of an aircraft is formed upon the lid component 14. This is to aid the aircraft technician in aligning the antenna within the housing 12 with the longitudinal axis of the vehicle 16; i.e., the heading axis 20. A gravitational switch also included within the device 12 provides an output signal indicative as to whether the housing 12 is mounted on the lower side of an aircraft or on the upper side. This permits the microprocessor-driven control system to accommodate for such mounting, and thus avoid the occurrence of any error on the part of the technician in mounting the system within an aircraft.

Figure 2:
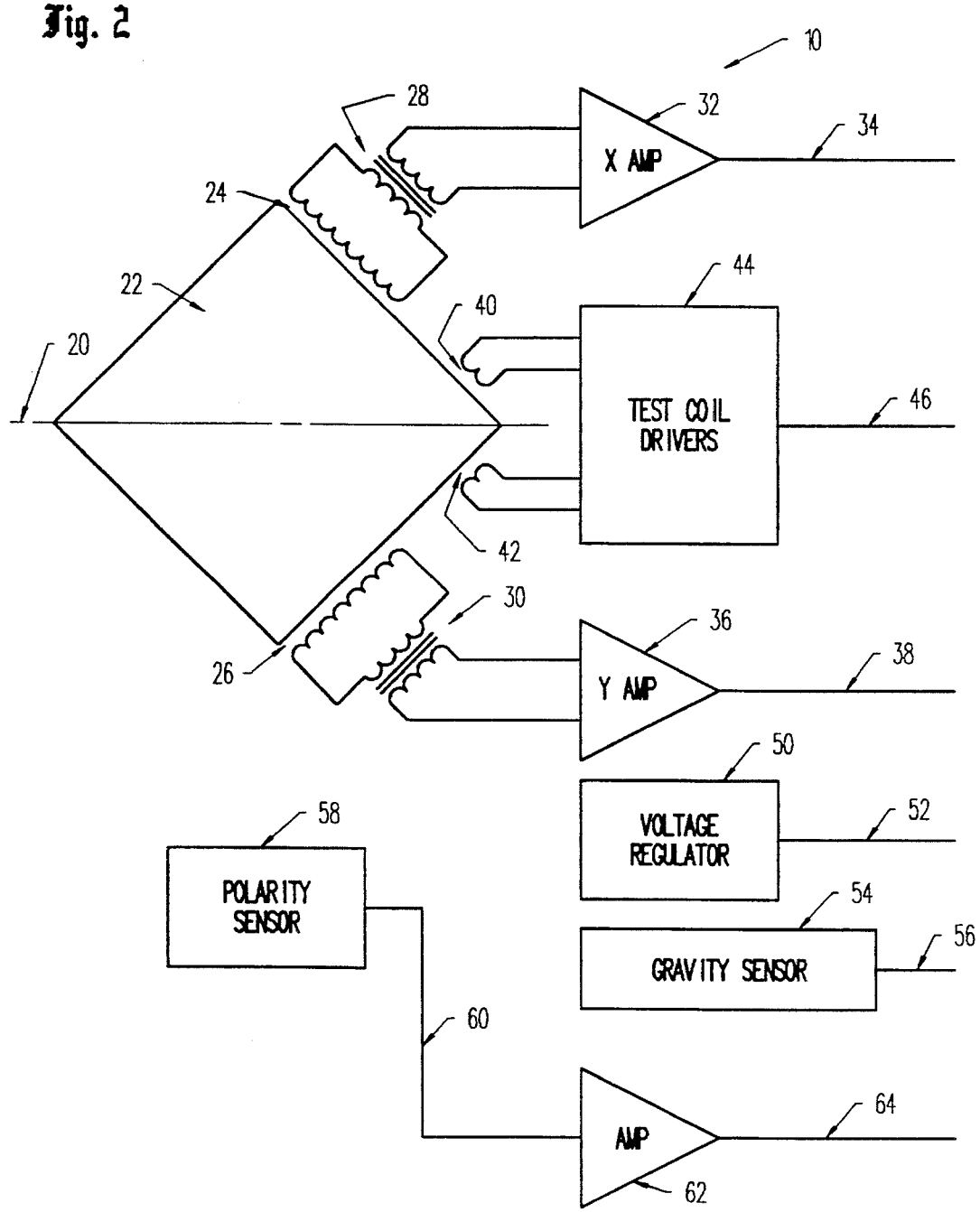
FIG. 2 is a schematic block diagram showing the components incorporated within the antenna housing of FIG. 1.

Looking to FIG. 2, a schematic representation of the components which are within the sensor assemblage 10 are revealed. In the figure, the heading axis 20 again is reproduced and is seen to diagonally extend across a square ferrite block 22 which functions in the conventional manner as an enhancement for antenna response to the electromagnetic radiation emanating from a lightning strike. Represented adjacent ferrite block 22 is a first H-field antenna coil 24, and, orthogonally disposed with respect to the coil 24, is a second H-field antenna coil 26. Note that coils 24 and 26 are represented in the figure as being oriented with respect to the heading axis 20 at an angle of 45°. Where, for example, a lightning strike is directly ahead of the sensor 10; i.e., along the axis 20, the two coils 24 and 26 thus will be at an angle of 45° to the origin of this signal. The signal received by both coils 24 and 26 then is identical in amplitude. Alternatively, if the axis 20 then turns by 45°, the signal in one coil will drop to a 0 amplitude while the other will become a maximum. This is a somewhat-conventional "figure 8" form of response characteristics However, the 45° orientation now provided with respect to axis 20 gives the most accurate bearing information. This literally holds true for the most important bearing at hand in an aircraft operational situation; i.e. a storm which is directly before the aircraft. By contrast, the accuracy of bearing information is the least accurate where one of the coils is at 90° to the point of origin of a lightning strike. The magnetic or H-field component of an electromagnetic wave will be manifested in the windings of antennas 24 and 26 as a current, while the electrostatic component or E-field component will not. Because the E-field is non-directional as it pertains to its reaction upon an antenna, its effect upon the windings 24 and 26 may be considered as contamination of directional information. Thus, the pick-off or detection of the H-field magnetic component, which is manifested as a current, is one which is, under the criteria of the instant invention and is selective to that current component. In effect, the E-field component becomes a common mode component, thus, by utilizing a current specific pick-off, a common mode rejection is achieved, This is developed through utilization of a small R-F current-detecting transformer 28 in conjunction with antenna coil 24 and a corresponding small R-F current-detecting transformer 30 in conjunction with antenna coil or winding 26. A common mode or E-field rejection is thus achieved. Other current specific pick-offs may be employed, such as an opto-isolator having a light-deriving component, the intensity of which is proportional to coil-generated current. However, the best mode contemplated for this current specific pick-off is the transformer arrangement as shown.

Because the signal generated at pick-offs 28 and 30 is of somewhat low level, a preamplification thereof is carried out at preamplification stage 32, having an amplified output represented at line 34. In similar fashion, the output of pick-off transformer 30 is preamplified at preamplification stage 36 and the resultant output is provided, as represented at line 38. The preamplification of the detected H-field signals at the sensor 10 itself permits the transmission of signals to the control circuitry within the aircraft cabin at a higher level and, thus, with more immunity to the noise and similar phenomena encountered in aircraft flight. The 45° orientation of coils 24 and 26 also will be seen to render them substantially immune from attitude variations which are common in aircraft flight. Thus, as the aircraft fuselage pivots about an axis transverse to the heading axis 20, the effect upon the response of windings 24 and 26 is far less than that, for example, exhibited by antenna windings which are oriented perpendicularly to the heading axis 20.

Of particular value to the performance of the system at hand, the microprocessor-driven control carries out a periodic testing of the entire system by imposing antenna test signals into the antenna structure and evaluating the resultant diagnostic signals. This is shown in the figure as a first test coil 40 associated with winding 24 and a second test coil 42 associated with antenna winding 26. These test coils 40 and 42 are driven by test coil driven represented at block 44. A single line 46 is shown feeding the test coil driven 44. Only a singular line is used for this purpose to avoid error. The selection by the control circuitry of which coil 40 or 42 to cause to be excited is elected through the corresponding election of the polarity of the signal imposed at line 46. Thus, one polarity input from line 46 will cause the excitation of coil 40 for diagnostic purposes, while the application of a test signal of opposite polarity from line 46 will cause the excitation of coil 42 for diagnostic purposes. With the test arrangement shown, the pilot is afforded essentially a continuous assurance of the operability of the system which, when needed, is of substantial importance to an aircraft occupant.

Additionally incorporated within the sensor assembly 10 is a voltage regulator, represented at block 50, having a power input, represented at line 52. The gravity sensor discussed above may be provided as, for example, a mercury switch. This gravity sensor is represented at block 54 and is seen to provide an output at line 56. The gravity sensor provides the control system with an indication as to the orientation of the antenna assemblage 10 such that appropriate accommodation may be made in the development of bearing information. Finally, a polarity sensor may be provided with the sensor assemblage 10. This generates information as to the polarity of the received electromagnetic radiation. Such function may be implemented as a planar conductor within the sensor assembly 10 and is represented at block 58.

Figure 3:
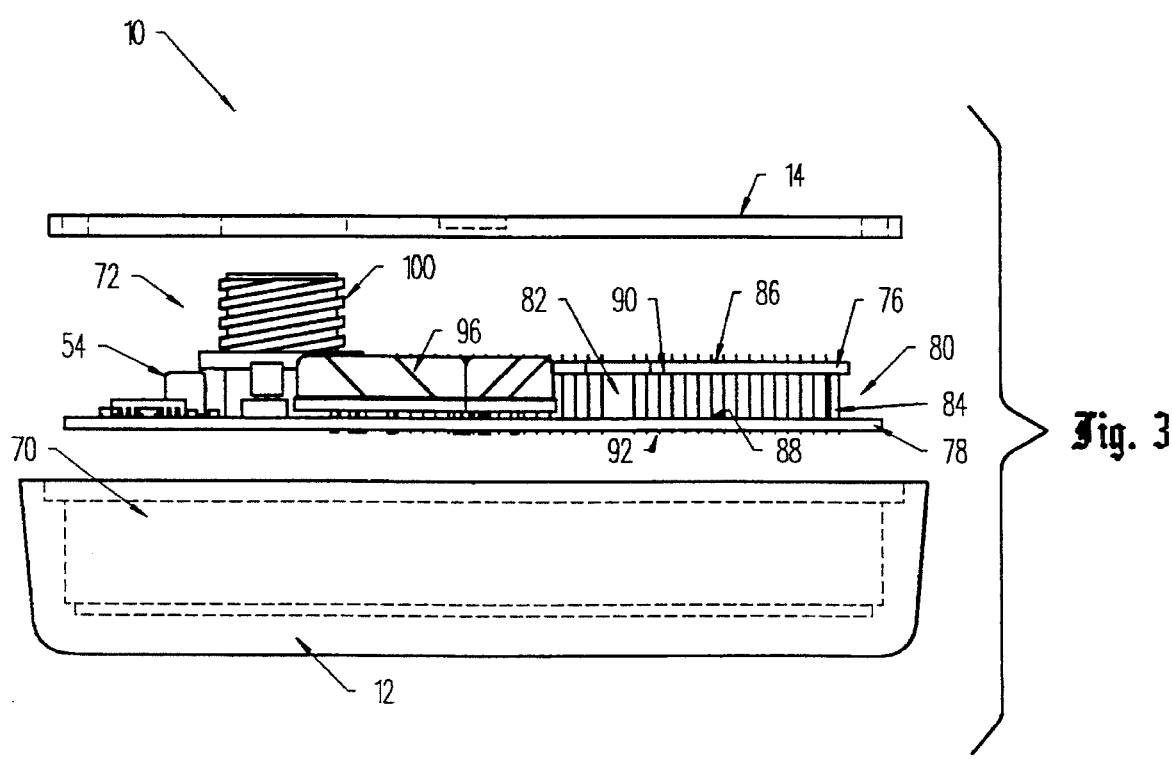
FIG. 3 is an exploded view showing the principal components of the antenna assemblage of FIG. 1.
Figure 4:
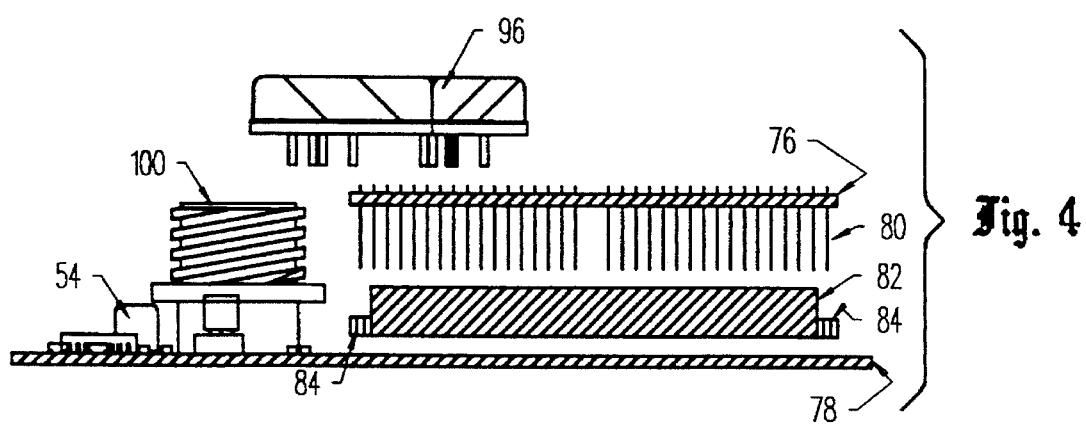
FIG. 4 is an exploded view of the circuit board structure component shown assembled in FIG. 2.

Turning to FIG. 3, the sensor assemblage 10 is represented in exploded fashion prior to its final assembly. In this regard, the quite compact and rigid elliptical housing 12 is shown formed having a cavity 70 therein within which a printed circuit board assembly 72 is positioned. Upon the securement and appropriate potting of the assemblage 72 within the cavity 70, the lid 14 is attached using, inter alia, screws represented at 74 in FIG. 1. Seen on this assemblage 72 is a first printed circuit board or substrate 76 which is located in spaced, mutually parallel adjacency with a second printed circuit board or substrate 78. The smaller printed circuit board 76 and the corresponding adjacent portion of circuit board 78 will be seen to carry printed conductive coil lines or stripes for forming the H-field coils 24 and 26. The printed substantially-parallel line arrays representing these coil windings are interconnected from one substrate 76 to the other 78 by arrays of peripherally-disposed conductive pins, represented generally at 80. Within these arrays of pins, which extend about the square peripheries of the coil defining circuit boards 76 and 78, is a square ferrite block 82. Looking additionally to FIG. 4, an exploded representation of the assembly of ferrite block 82, circuit boards 78 and 76 and pin arrays 80 is revealed. The ferrite block 82 is retained rigidly in position and in intimate association with the printed circuit boards 76 and 78 both by adhesive attachment and through the utilization of plastic retainers 84 through which the individual pins of the array 80 extend and are supported. The pins of the array 80 function to complete the formation of coils 24 and 26. This is achieved by an association of parallel line arrays for one coil located at the first or top surface 86 of substrate 76 and the top surface 88 of substrate 78. The printed circuit lines or stripes on the surfaces 86 and 88 then are connected by corresponding pins of the array 80. These parallel lines as defined at surfaces 86 and 88 are arranged in one 45° sense with respect to axis 20. The other H-field coil is formed at the bottom or second surface 90 of substrate 76 and at the corresponding bottom surface 92 of substrate 78. As before, the spaced parallel line arrays are interconnected to define coils by appropriate pin arrays 80. The line arrays at surfaces 90 and 92 are orthogonally disposed with respect to the coil defining line arrays of surfaces 86 and 88. Thus, the alignment of each antenna is at 45° with respect to axis 20. The small R-F pick-off or detector transformers 28 and 30 are retained within brass housings in close adjacency with the appropriate pins of array 80 in the assemblage. One such transformer assemblage is represented in FIGS. 3 and 4 at 96. Additionally shown in these figures is the noted gravity switch or sensor 54 and a cable output/input connector 100.

Turning to FIG. 5, the substrate or printed circuit board 78 is revealed, additionally showing the top surface 88 thereof. Printed on this surface 88 is the array 102 of printed conductive lines forming essentially one-half of one of the coils, for example, coil 24. The oppositely-disposed line array of this coil 24 is shown in FIG. 6 as a line array 104 located on the top surface 86 of substrate 76. The earlier-described pins within array 80 associated with the line arrays 104 and 102 extend through the linear hole arrays 106 and 108 in substrate 76 as shown in FIG. 6 downwardly and vertically into corresponding respective linear hold arrays 110 and 112 extending through substrate or printed circuit board 78. Note that the lines of array 102 are at a 45° angle with respect to heading axis 20 again represented in FIG. 5 and, are parallel with the lines of array 104. The detecting transformer 28 or, for example, that represented within the protective brass container 96, is positioned at the outline 96' shown in FIG. 5. Note that the transformer, as earlier represented at 28 in FIG. 2, is located in adjacency with the pins extending from hole array 106 through hole array 110.

The bottom surface of circuit board or substrate 76 is represented again at 90 in FIG. 7. This bottom surface 90 contains an array of printed conductive lines represented generally at 114 and shown in phantom such that the angular relationship of these lines of the array 114 may be observed to be in an orthogonal or perpendicular association with the corresponding array 104 at the top of substrate 76. A corresponding parallel array of printed conductive lines (not shown) is located on the bottom of the circuit board or substrate 78 as seen in FIG. 5 immediately below the line array 102. Note that the lines of array 114 extend between linear arrays of holes 118 and 120 which receive pins from the array 80 extending therefrom to corresponding hole arrays within substrate 78 as shown in FIG. 5 respectively at 122 and 124. An outline 98' is shown in FIG. 5 which is intended to receive the current responsive transformer as at 30 such that it is in close physical association with the coil components represented by the pins extending through hole array 122.

The earlier-described test windings 40 and 42 (FIG. 2) are developed with the printed circuit approach as windings formed of printed conductive lines and associated pins. In this regard, it may be observed in FIG. 6 that one such test winding printed line is shown at 125 and in FIG. 5 at 126. Correspondingly, a test winding 127 is provided with respect to the bottom of substrate 76 which performs in conjunction with a corresponding conductive line (not shown) printed upon the bottom of substrate 78.

Now considering the control system of the thunderstorm monitor, a cable carries the data from sensor 10 via connection with earlier-described connector 100 to the control components located within the aircraft cabin. This control system treats the signals by digitizing them to develop a string of binary numbers which are stored at very high speed in memory. For example, the system will typically carry out 20,000,000 to 24,000,000 measurements per second. These data, as thus digitized, are examined in real time by a threshold responsive form of circuit to determine whether the system has interest in the data as emanating from a thunderstorm. This evaluation is made on a digital basis. For example, when a key threshold is crossed, the instrument takes an additional 500 samples and presents them to memory. An analysis is made of the digitized signals and a number of key decisions are made as to whether the data emanated from a thunderstorm. This is based on the characteristics of thunderstorm signals. A determination then is made as to the bearing of the thunderstorm and measurements are evolved based upon the strike rate of the thunderstorm to classify its strength and height. The strike rate is represented as the number of strikes per second and is a measure of the size of the thunderstorm, particularly its height. In effect, by having a very accurate bearing and knowing the rate at which strikes are coming in on this bearing, the system can identify how strong the storm is; i.e. how tall and the like. Received signal strength may be employed as an indication of strength. Thus, strike rate, heretofore considered only as an average, is specifically employed with the control system as a key required to classify storm intensity. The control system further carries out a Fourier transform on the received data. This is because the transfer function of the atmosphere; i.e. the efficiency at which the atmosphere transmits various frequencies varies with respect to the value of those frequencies. Certain of the frequencies are conducted through the atmosphere efficiently and some less efficiently; i.e. some decay at a more rapid rate than others. Inasmuch as it is known that the thunderstorm or strike produces a uniform amount of these frequency components at the source, the ratio of components provides a highly accurate identification of range. Thus, the spectral distribution of the electromagnetic radiation emanating from a strike is quite important and, it is imperative that the instant system perform on a broad-band basis in order to acquire all of the necessary data. In particular, the sensor or antenna assemblage 10 exhibits a very broad band, its response characteristics being flat, for example from 50 Khz to 5 Mhz. In comparison with conventional storm monitoring devices, the instant system will make 2,000 measurements over the broad band of frequencies noted, while such conventional device will make one measurement within a restricted bandwidth.

Figure 8:
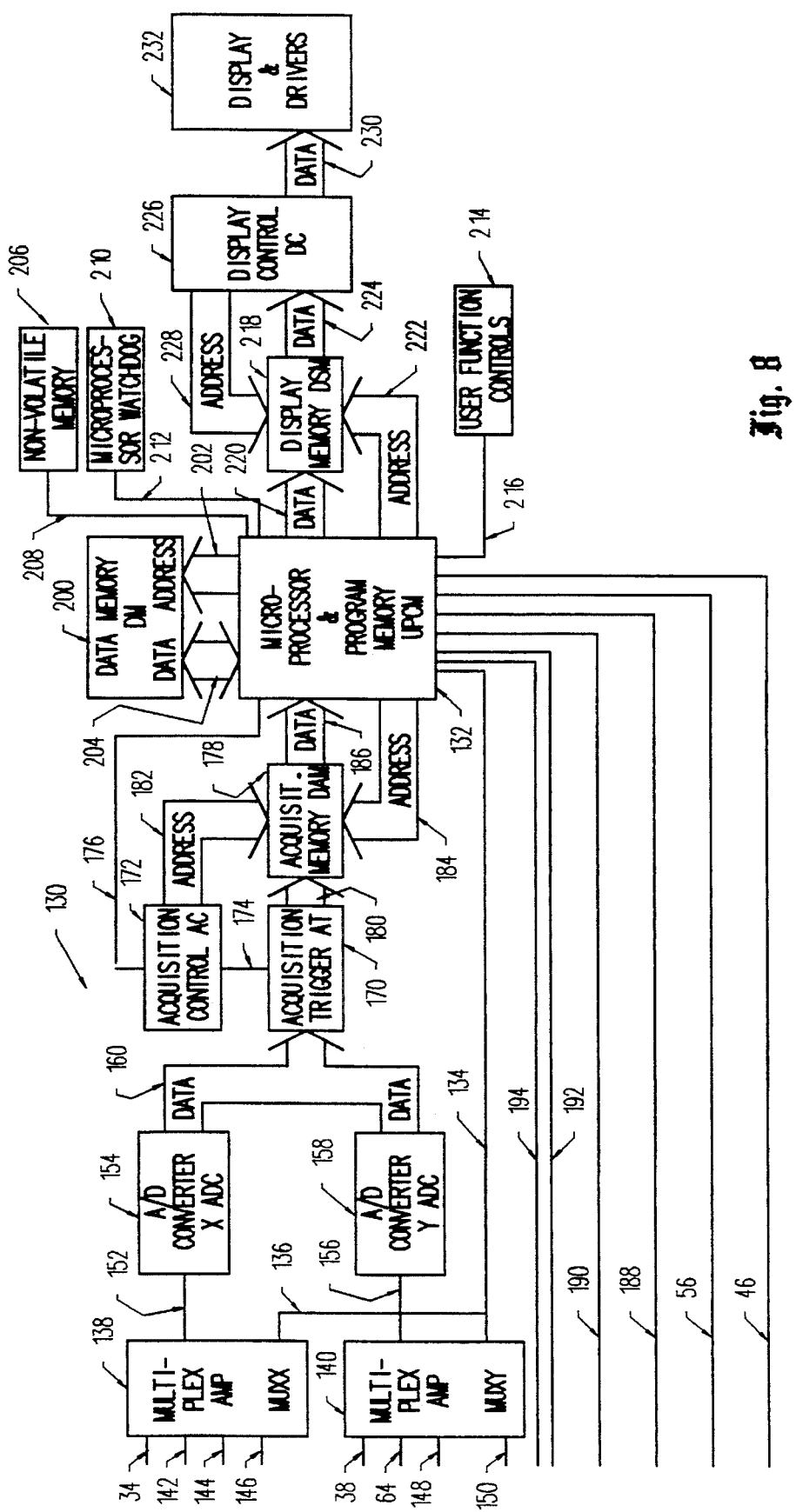
FIG. 8 is a block diagrammatic representation of the cabin mounted instrumentation employed with the sensor assembly shown in FIG. 1.

Referring to FIG. 8, a block diagrammatic representation of the control system is represented generally at 130. In the control, a microprocessor with associated program (ROM) memory is provided, as represented at block 132. From this control 132, as represented by line 134 and 136, data are acquired through a multiplex amplifier function represented at blocks 138 and 140. In this regard, multiplexer function 138 is considered an "X" function as associated, for example, with H-field coil 24. The multiplexer, accordingly, receives preamplified analog signals from earlier-described line 34 (FIG. 2). Additionally, the multiplexing function 138 will select a corresponding heading X-snychro input, as represented at line 142, from the aircraft navigational system. Further, a gain select function may be carried out in response to multiplexed selection and the control system may measure and accommodate for offset by providing an offset output command via multiplexer 138, as represented at line 146. Multiplex amplifier function 140 is associated with a "Y" designated antenna corresponding, for example, with H-field antenna 26. This input again is represented at line 38 being selectable by multiplexing function 140. Additionally, the multiplexer 140 may select polarity information via line 64; Y-synch inputs via line 148, and a photocell input measuring cabin ambient lighting intensity via line 150.

The X-antenna input at line 34, when selected by multiplexing function 138 is transmitted, as represented by line 152, to an analog-to-digital converter function for this X-channel, as represented at block 154. In similar fashion, the Y-antenna input data are, when selected, transmitted, as represented at line 156, to an analog-to-digital converter stage represented at block 158. The 8-bit binary number strings developed from converters 154 and 158 then are delivered via databus 160 to a digital signal processing function (DSP), represented as including an acquisition trigger at block 170. The acquisition trigger 170 is controlled by an acquisition control function, represented at block 172 and line 174. The control 172, in turn, is controlled from the microprocessor function 132, as represented by line 176. Acquisition trigger 170 carries out the noted threshold evaluation of incoming antenna-derived and digitized data, and that which is selected is submitted to acquisition memory, as represented at block 178 via bus 180. Placement of data within memory 178 is under the address control of the acquisition control function 172, as represented by address bus 182. The microprocessor or control function 132 acquires the data so stored at memory 178 by appropriate address commands via bus 184, the data flow from memory 178 to the microprocessor function 132 being represented at bus 186.

Additionally, non-multiplexed inputs and the like submitted to or transmitted from the microprocessor function 132 will include the antenna test output, as earlier described at line 146 and herein represented by that numeration, as well as the gravity sensor input, as earlier-described at line 56 and again shown with that line numeration. Further, a heading step input from the stepper function of an onboard compass is submitted, as represented at lines 188 and 190. Additionally, a serial data interface is made available, as represented at line 192 and a lamp intensity control output is provided, as represented at line 194.

Microprocessor function 132 performs in conjunction with a data memory represented at block 200 which is addressed from the microprocessor, as represented at bus 202 and bi-directional data exchange is provided between function 132 and memory 200, as represented by bus 204. Critical data also may be stored in non-volatile memory represented at block 206 and communication with the microprocessor is provided via a bi-directional one-line bus 208. The appropriate performance of the microprocessor function 132 is monitored by a watchdog circuit represented at block 210 and line 212.

User function controls, particularly including hand-actuatable switches at the display of the system, are represented at block 214 and their actuation commands are submitted to microprocessor function 132, as represented by line 216. Following the processing of data on the part of the microprocessor function 132, that data then are submitted to display memory 218 via databus 220. The display memory address input from the microprocessor function 132 with respect to submitted data is provided via address bus 222. Data within memory 218 is submittable via databus 224 to a display control represented at block 226. Display control 226, in turn, addresses the display memory 218 for selection of data, as represented by address bus 228. The accessed data then may be submitted, as represented at bus 230, to a plasma display and associated display drivers represented at block 232. Through the use of a plasma form of display, the large bulk otherwise associated with such display components as cathode ray tubes and the like is avoided.

Figure 9:
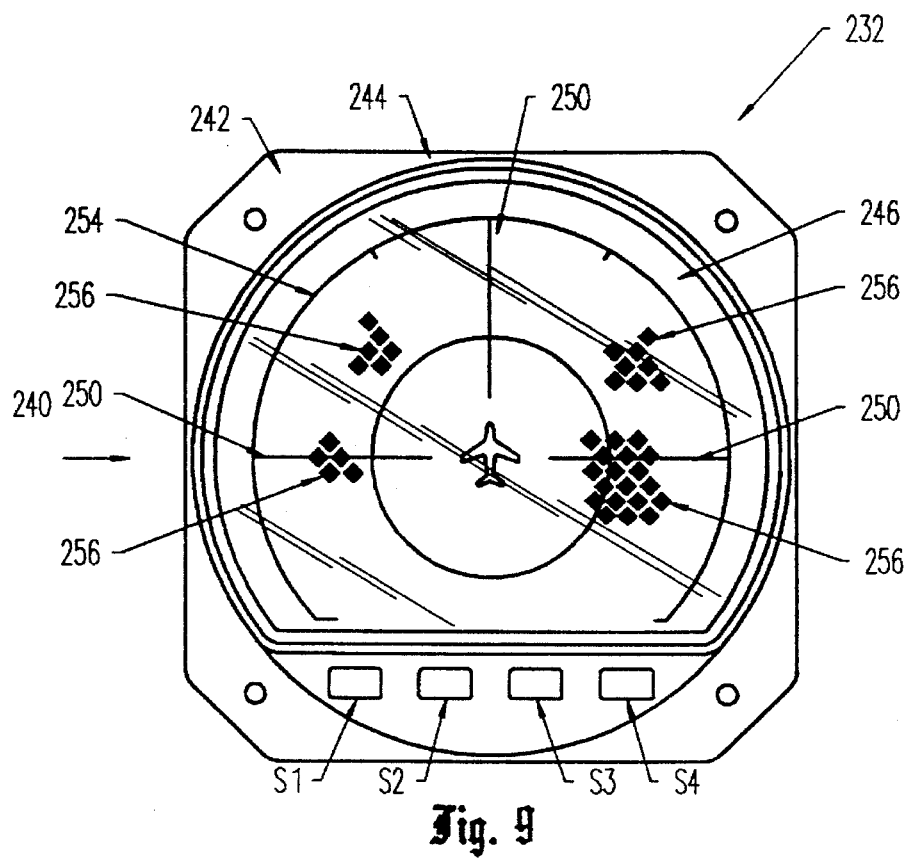
FIG. 9 is a front view of the display readout mounted within the cabin of an aircraft.

The display function represented at block 232 in FIG. 8 is principally comprised of a neon plasma display which ideally fits within a standard aircraft instrumentation hole. These holes are circular having a diameter of 3⅛ inch. Looking to FIG. 9, the readout component of the display is represented at 240 as including a housing component 242 which is formed forwardly to define a circular bezel 244 which mounts through the noted instrument hole. The entire readout structure including display drivers has a widthwise or depth extent of about 1 inch and the principal component thereof is a 64×64 pixel matrix neon plasma display. Over the display is a plexiglass lens represented generally at 246 which carries indicia or legends intended to be lighted at night. A circularly-polarized filter is also positioned before the plasma display to provide an increase in contrast. For night illumination, one or more small lamps within the housing may provide edge lighting to illuminate the legends positioned upon the plexiglass lens. Additionally, a photocell may be employed for the purpose of monitoring the level of cabin light to adjust the intensity of such illumination under the control of the microprocessor 132, for example, as discussed in connection with line 194 in FIG. 8. The legends at the display 232 on the lens thereof, include a small airplane silhouette 248, the direction of which represents heading. Bearing marks 250 are provided as well as range marks or circles 252 and 254. Shown in exaggerated scale at the display 240 are storm indicators which are perceived by the aircraft pilot to be represented as groupings of diamond-shaped pixels as seen at 256. These plasma-illuminated small square outputs identify thunderstorm locations with respect to the ranges, represented by markers 252 and 254. In this regard, the outside range ring or marker 254 may represent 25, 50, 100 or 200 miles. Correspondingly, the inside ring or marker 252 will represent one-half of the range of the outside marker 254. Switch S4 represents a clear button and switch S1 provides a "time travel" function. Actuation of switch S1 triggers a time-lapsed rendition of recent electrical activity. Up to 4,000 strikes are replayed at the display in a matter of seconds to reveal important weather trends. This shows whether the aircraft is approaching a worsening weather condition or an improving weather condition. A desirable aspect of the noted ranging achieved with the actuation of switches S2 and S3 is in the "zoom" transition from one range to another. Rather than an abrupt switching from one range condition to the next, a smooth transition occurs to give the pilot further guidance as to the condition at hand.

Figure 10:
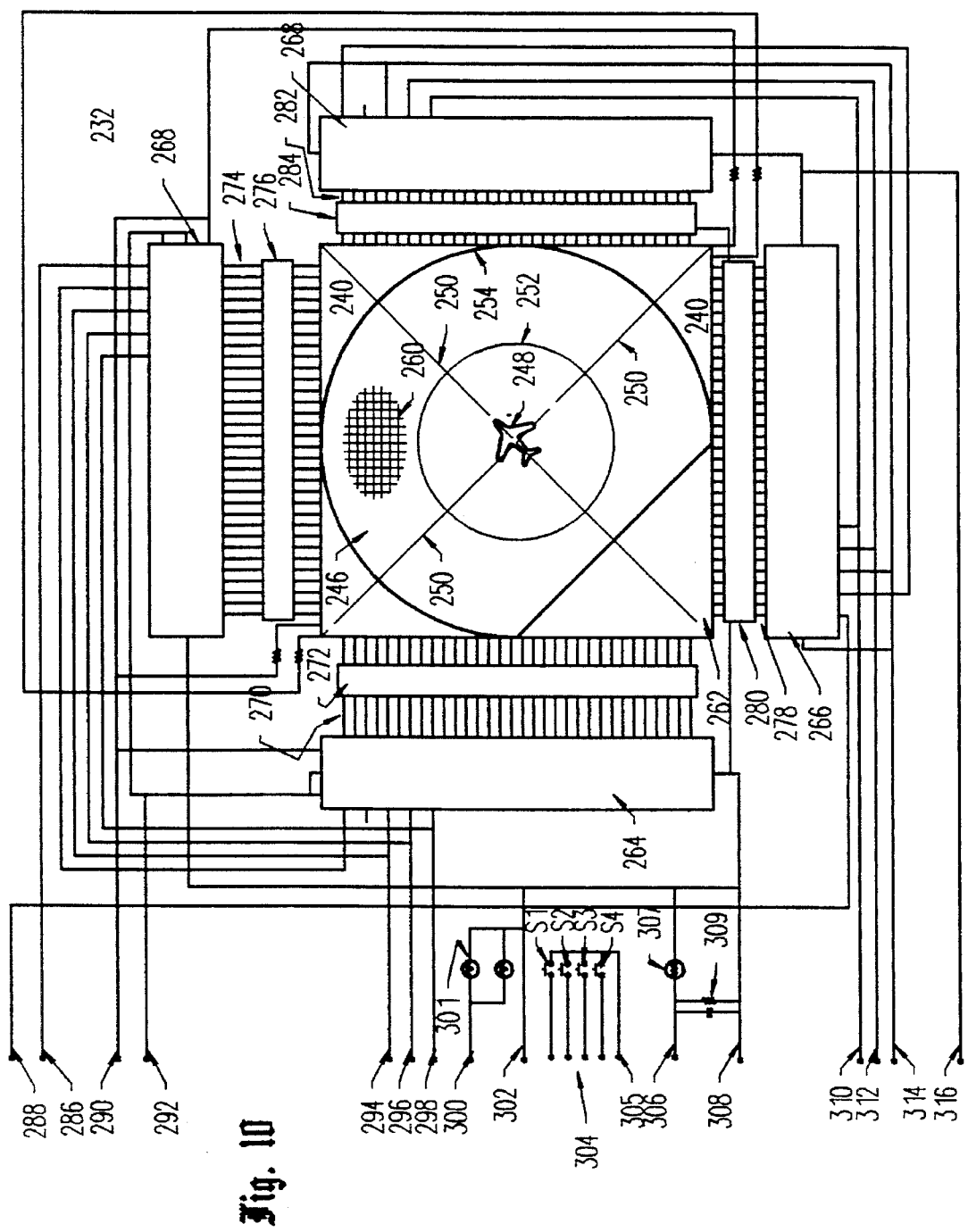
FIG. 10 is a schematic diagram of a display driver circuit having an overlay of the lens with markings shown in FIG. 9 positioned thereon.

Referring to FIG. 10, a schematic diagram of the plasma display and associated driver components is provided in a manner wherein the lens 246 and legends are superimposed thereon. This orientation shows the 45° relationship between bearing markings 250 and the 64×64 column/row orientation of the components of the display. This column/row orientation is represented generally at 260. The plasma output device is represented at 262 in conjunction with two anode drivers 264 and 266 as well as two cathode drivers 266 and 268. Note in this regard that the output of anode driver 264 is provided at a 32-lead array 270 which extends through an array of resistors represented at block 272 to anode coupling with device 262. Similarly, anode driver 266 provides a 32-lead array 274 which extends through a resistor array represented by block 276 to device 262. Cathode driver 266 similarly has an output lead array 278 which extends through a corresponding array of resistors represented by block 280 for connection with the cathode components of device 262. Cathode driver 268 similarly has an output at 32-lead array 282 which extends through a corresponding array of resistors as shown at block 284 for connection with device 262. The display 262 is addressed as a 64×64 X-Y matrix wherein 64 anodes are driven in parallel and one cathode is enabled at a time. Both of the anode driver circuits and the cathode driver circuits have serial data paths, the serial "out" terminal of one being coupled with the serial "in" terminal of the next. In this regard, serial data comes into the anode driver 266 from anode data line 286 as a sequence of 64 bits. Once the 64 bits are in place, a latch signal is provided to fix the anode data within the driver chips. Upon being fixed, a new string of 64 bits is initiated essentially immediately. In the cathode system, only a single output or bit is "on" in either driver circuit 266 or 268 at a given time. Thus, a single bit is clocked through the system as emanating, for example, from line 288. A +80 v supply is provided at line 290, while +12 v supply is provided at line 292. Below the latter line, are three lines 294, 296 and 298 providing, respectively, an anode strobe, anode clock, and an anode enable input. Next, a lamp energization line is provided at line 300 for use in conjunction with lamps 301 serving to illuminate the lens. A lamp ground is provided at line 302. An array of lines then extend to switches S1–S4 as described in connection with FIG. 9, the final line 305 being a common. A photocell output extending from photocell 307 is provided at line 306, the signal ground being provided at line 308. A scaling and filtering capacitor-resistor may be provided, as represented generally at 309, for employment with the photocell 307. Photocell 307 monitors the intensity of cabin light and adjusts light intensity or brightness of pixels within the display. The inputs then include a cathode enable input at line 310, a cathode clock signal at line 312, −88 v supply at line 314 and −100 v supply at line 316.

Figure 11:
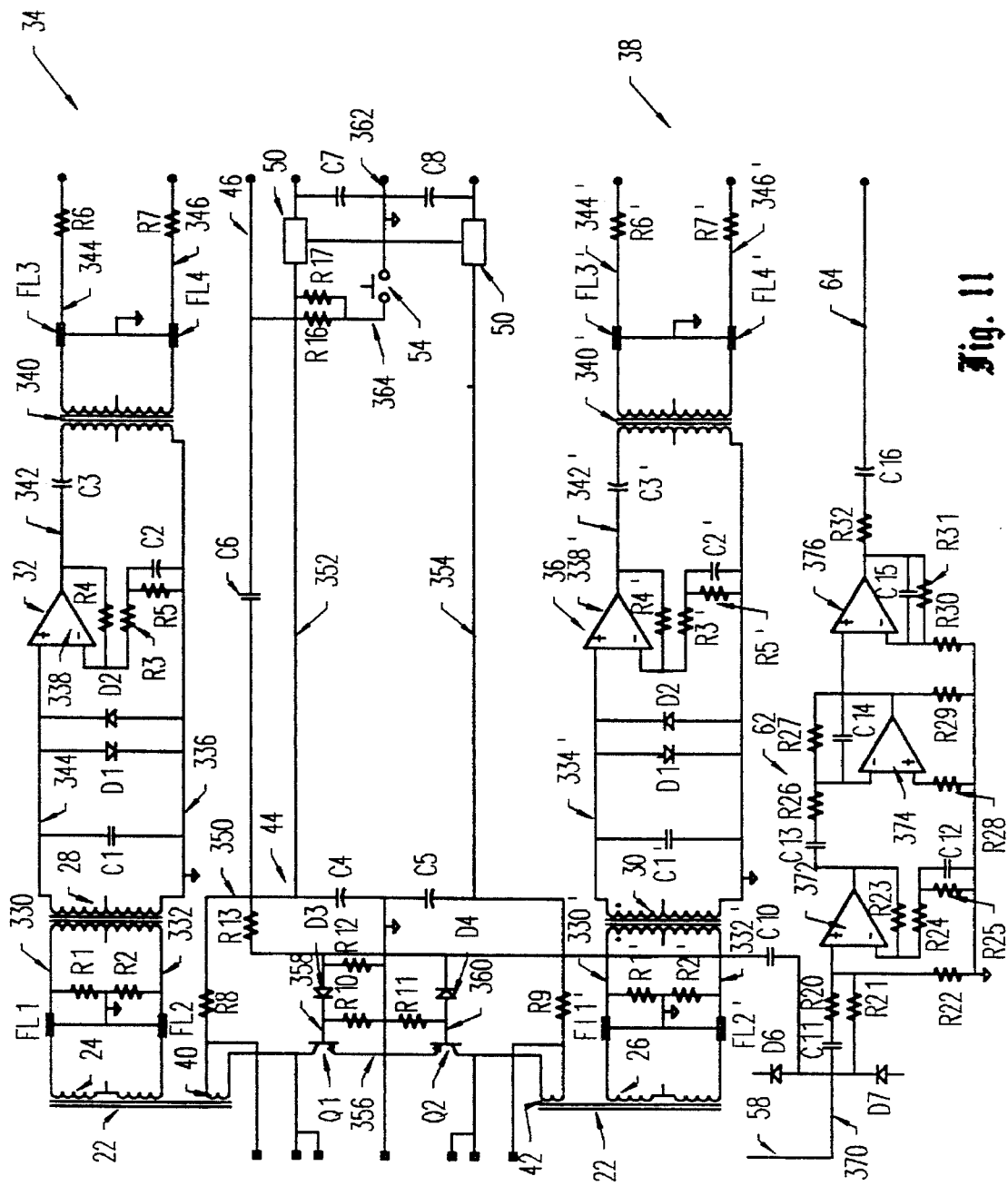
FIG. 11 is an electrical schematic diagram of the block diagram shown in FIG. 2.

Referring to FIG. 11, a schematic representation of the circuitry encapsulated within the sensor 10 is revealed at an enhanced level of detail. The components within this figure have been described in conjunction with FIG. 2. Accordingly, where appropriate, common numeration is retained. In the figure, the ferrite core 22 is represented by a core symbol in conjunction with the H-field antenna windings 24 and 26. While the symbolism of the windings is shown as a dual winding arrangement, they remain a single winding as above discussed. Winding 24 is seen coupled by lines 330 and 332 to coaxial distributed inductance/capacitance filters shown respectively at FL1 and FL2. These filters are formed of a ferrite material with a capacitance coating about the outside thereof. Resistors R1 and R2 extending between lines 330 and 332 provide load impedance for the coil and the lines 330 and 332 then extend to the primary of common mode rejection transformer 28. Transformer 28 also supplies a modicum of gain, for example about 5:1 through a step-up arrangement of its windings. It may be noted that the inductance of coil or windings 24 and the impedance provided by resistors R1 and R2 develop an inherent integration of the signal derived at winding 24. Thus, there is developed a straight measure of strike current without the necessity of interposing an integration stage. In effect, magnetic flux is measured directly. The secondary winding of transformer 28 is coupled with line 334 and ground line 336. Extending between these lines is a capacitor C1 and cross-coupled diodes D1 and D2. The latter components are present for transient protection. Line 334 is seen to extend to the positive input of an operational amplifier 338 of preliminary amplification stage 32. High gain amplifier 32 has a gain arrangement enhancing higher frequency. In this regard, the d.c. gain is determined by the combination of resistor R4 and the series combination of resistors R3 and R5. As the frequency elevates, capacitor C2 serves to override or "swamp" resistor R5, causing the a.c. gain of the stage to increase. Thus, the d.c. offset is amplified with very little gain and the a.c. signals are substantially amplified. The output of amplifier 338 at line 342 extends through capacitor C3, functioning to block a d.c. term to the primary winding of a coupling transformer 340. A shielded, twisted line pair is utilized to direct the output from the preamplification stage to the instrumentation within the aircraft cabin. Any noise imposed on that shielded, twisted pair will be an E-field signal which otherwise would cause fluctuation at the output. However, inasmuch as these phenomena perform together and by virtue of the presence of transformer 340, an effective cancellation of such phenomena occurs. The secondary of transformer 340 provides an output at lines 344 and 346 which is filtered by filters FL3 and FL4 which are identical to corresponding filters FL1 and FL2. Impedance matching resistors R6 and R7 are seen positioned within respective lines 344 and 346. H-field winding 26 and its associated transformer 30 are configured within an identical circuit as winding 28 and transformer 28. Thus, that circuit including preamplifier stage 36 is shown having the same component identification as above but in primed fashion.

Now looking to the test coils 40 and 42, as well as the test coil drivers earlier described at 44, test coils 40 and 42 again are identified in FIG. 11 by the same numeration. Test coil 40 is shown coupled via resistor R8 and lines 350 and 352 to +5 v supply as developed by the voltage regulator earlier described at 50 and shown by the same numeration in this figure. Similarly, coil 42 is seen coupled by resistor R9, line 350, and line 354 to −5 v supply as developed by the regulator 50.

The opposite side of winding 40 is coupled to the collector of NPN transistor Q1 while the corresponding opposite side of winding 42 is connected to the collector of PNP transistor Q2. The collectors of transistors Q1 and Q2 are commonly coupled by line 356. With the arrangement shown, when transistor Q1 is "on", transistor Q2 is "off" and a current pulse flows through resistor R8 and winding 40 to generate a magnetic field. This field then is coupled into the antenna 24 for test or diagnostic purposes. Note that a diode D3 is coupled within line 358 to the base of transistor Q1, while an oppositely oriented diode D4 is coupled within line 360 to the base of transistor Q2. Lines 358 and 360, in turn, are seen to be coupled with singular line 46. Thus, where the signal at line 46 is positive above ground, then transistor Q1 is turned "on" and transistor Q2 is turned "off". Conversely, where the signal at line 42 is negative or below ground, then transistor Q2 is turned "on" through resistor R9 and transistor Q1 is turned "off" to effect the transmission of a diagnostic or test pulse through winding 42. Accordingly, the positive signal drives the X channel and the negative signal at line 42 drives the Y channel. Resistors R10 and R11 function to maintain transistors Q1 and Q2 in an "off" state when there is no test pulse at line 42. Resistor R12 performs an attenuation function with resistor R13 to adjust the scale of the magnitude of the test pulse at line 46.

The mercury or gravity switch 54 again is represented in the drawing with the same numeration as coupled between ground at line 362 and the test line 46. The test signal is a.c. coupled to the test line 46, while this switch is d.c. coupled thereto. Note in this regard, the connection of oppositely disposed line 364 through resistor R17 to +5 v at line 352 and through resistor R16 to line 46. Thus, a d.c. term or level at test line 46 elevates up or down in conjunction with the position of switch 54. Capacitor C6 within line 46 functions to block this d.c. signal. With the arrangement shown, the system can determine whether or not the mercury switch 54 is connected. Thus, during an antenna test, if a d.c. term returns over the test line 46, the system will be aware that the gravity switch is performing.

The polarity sensing function within the sensor unit 10 again is represented to include a field plate shown as line 58. Line 58 is seen coupled by line 370 to one input of an operational amplifier 372. Diode D6 and D7 perform a clamping function to dissipate transients or the like and additionally are seen coupled through capacitor C10 to line 46. Capacitor C11 along with resistors R20–R22 provide an appropriate impedance for the antenna 58 to drive. Amplifier 372 is the initial amplifier of three successive amplification stages including operational amplifiers including additionally amplifier 374 and amplifier 376. These stages are configured with capacitors C12–C15 and resistors R23–R31 to provide an amplified output at line 64. Resistor R32 and capacitor C16 provide impedance matching with a coaxial cable which is represented by the latter line 64.

Figure 12:
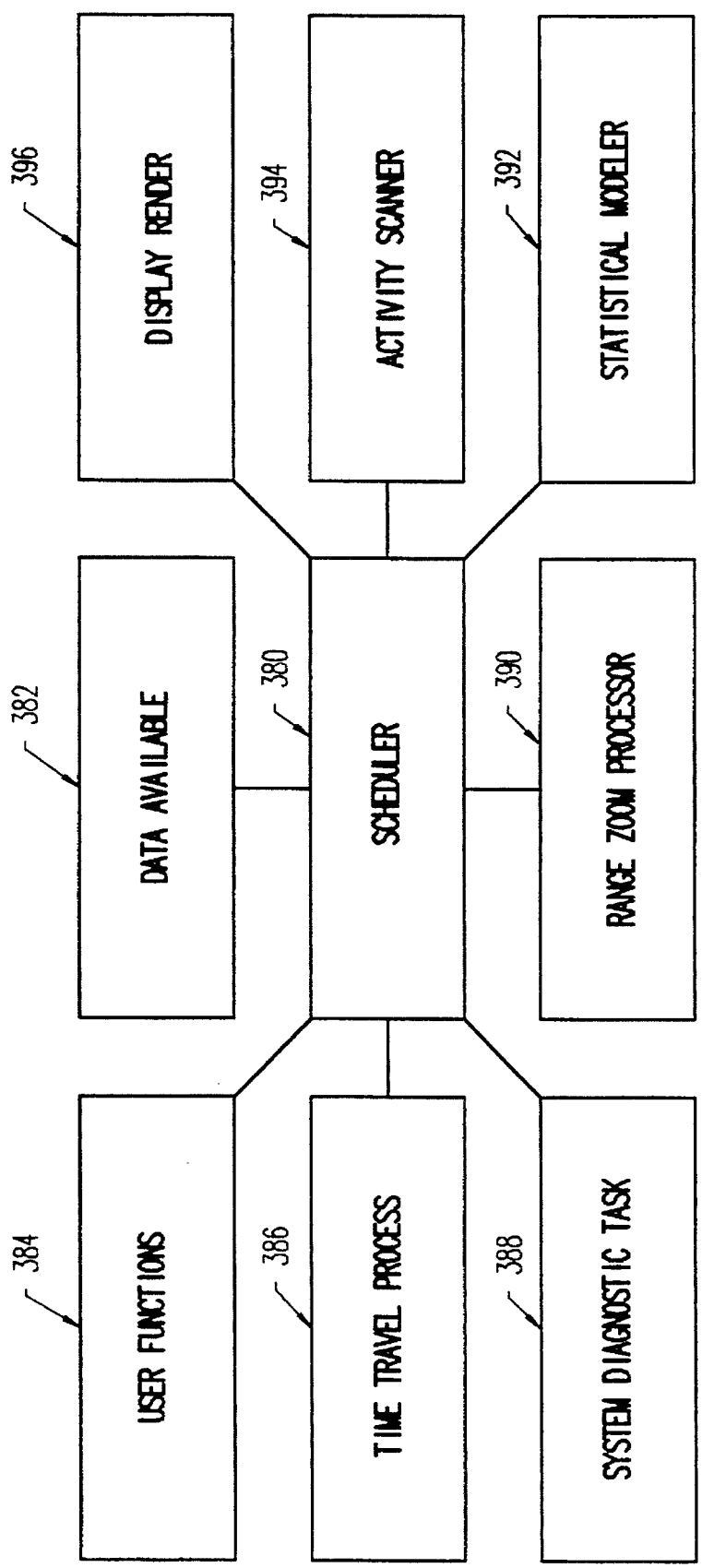
FIG. 12 is a block diagram of the relationship of control tasks with a scheduler program.

The microprocessor and program memory function represented at block 132 in FIG. 8 incorporates a variety of control routines and activities including a general handler activity for controlling program flow, responding to certain interrupts, and the like. Referring to FIG. 12, the functional association of the scheduler activity is presented in block diagrammatic form. In the figure, the scheduler is represented at block 380. As is apparent, the system performs actively in the presence of a lightning strike. At such time, data become available and interact with the scheduler program. This data-available association with the scheduler 380 is represented at block 382. The scheduler 380 also responds to user functions, as represented at block 384. These user functions are associated with the actuation of switches S1–S4 as described in conjunction with FIG. 9. The time travel process represented at block 386 is an extension of the user function 384 inasmuch as it is activated upon the pilot actuation of switch S1. When switch S1 is so actuated, a determination is made as to whether data are available for this function to perform. If such data are available, then a flag is posted to cause the system to replay the data corresponding with an assigned time lapse. In effect, the time travel process function periodically intervenes and controls where in data memory 200 the display information comes from. Normally that information comes from the most currently filled part of memory. However, this particular function 386 looks to the earlier-received and still-present information. The function is quite valuable to the pilot inasmuch as it affords an opportunity to compare current data with past data to determine whether or not a weather condition is worsening. A system diagnostic task, as represented at block 388, primarily represents the activities surrounding the generation of test pulses applied to the antennae for the purpose of diagnostics. The feature also includes a power-up testing of all memory and other functions including the earlier-noted offset measurement and nulling procedure. A range zoom processor, as represented at block 390, also is triggered with the user function actuation of switches S2 or S3. For example, when a larger range is elected by the pilot, the illuminated pixels at the display will converge towards its center and, conversely, where a smaller range is elected by the pilot, the illuminated pixels will expand outwardly until the new range imaging is completed. The statistical modeler, as represented at block 392, is represented as a collection of codes which function to assemble data used to determine what the characteristics of the storm being encountered are. Rather than providing a logic or forming decisions based upon a single stroke as has been the procedure of the past, the instant program contemplates groups of strikes which may be considered to represent the whole storm activity. Accumulated data then evolve a statistical model including strike rates in various quadrants utilized for analysis. Associated with the modeler activity 392 is an activity scanner function represented at block 394. This activity scanner function 394 identifies recent storm activity and calculates log to the base 2 values for that activity. The logarithmic relationship is employed, inasmuch as it provides a useful tool for activity data which will range from 0 to quite large values. By compressing these data logarithmically, a more effective evaluation procedure may be achieved. The display render function, as represented at block 396, is a continuous software task running between 3 and 5 Hz to update the data at the screen or display. This updating must be sufficiently rapid or crisp to accommodate, for example, heading changes of the aircraft where all data, in effect, are rotated. Similarly, the earlier-described changes in range involve substantial display activities.

Figure 13:
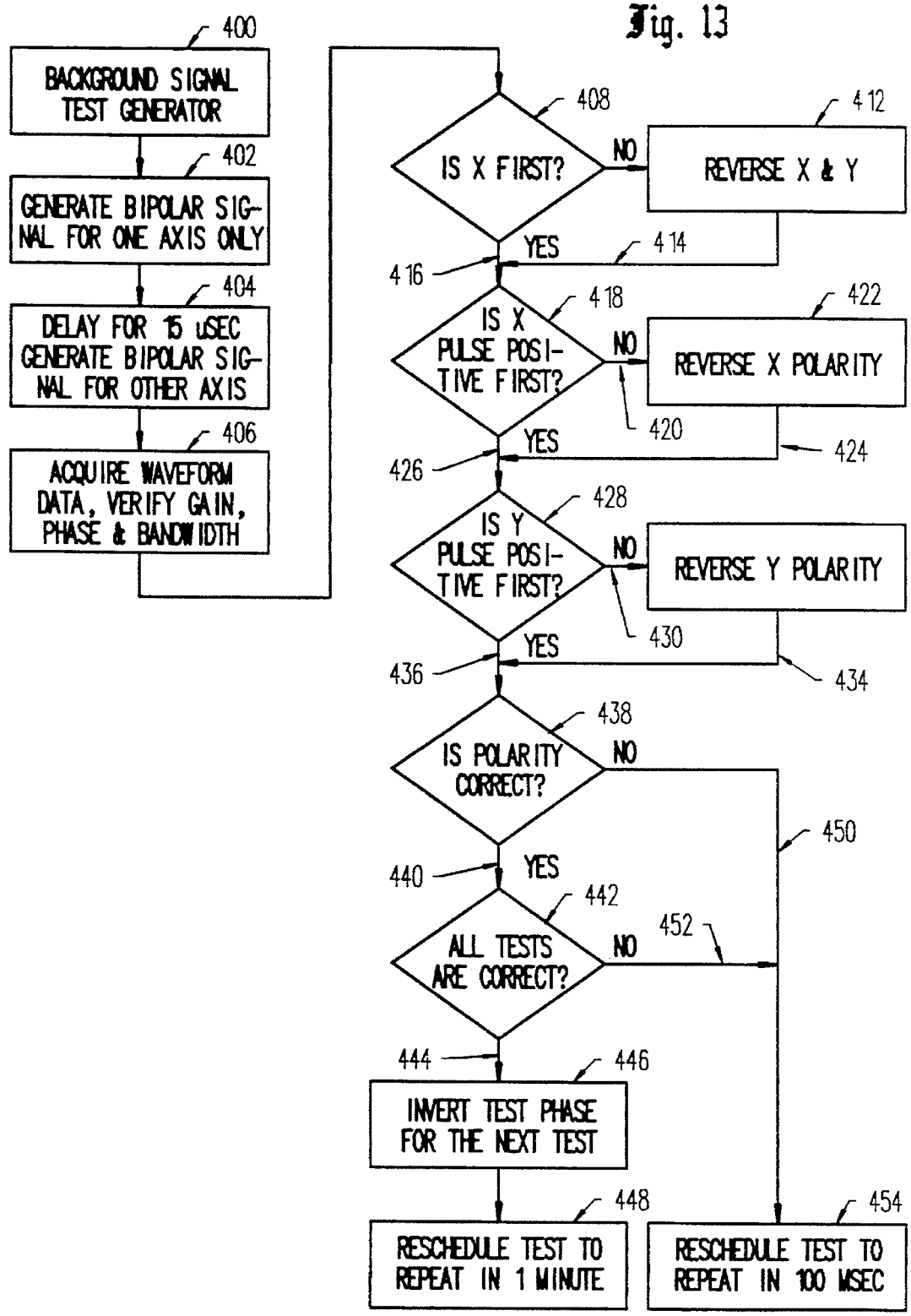
FIG. 13 is a flow chart showing the activities of a background signal test generator.

Referring to FIG. 13, the background signal test generator routine is displayed in flow diagrammatic fashion. The earlier-described test pulses must be uniquely identifiable from among all forms of interfering sources such as lightning or aircraft-based interfering sources, for example, servo motors and the like. An initial consideration in achieving this uniqueness is the recognition that an external source of information, for example from a lightning strike, will be transmitted through the atmosphere and will be received or picked-up by all of the antennas simultaneously. Similarly, where such an external source is so positioned as to influence only one of the two H-field antennas, then no signal will be received on one antenna while the entire signal will be received on the other. However, each of the coils 24 and 26 generally will be influenced. However, the X-designated coil 24 is driven separately from the Y-designated channel or coil 26 under test conditions. Accordingly, the X-channel is driven or excited initially and about 15 microseconds later, the Y-channel is driven. Comparisons then are made based upon this sequential premise inasmuch as the opportunity for such a phenomenon to occur from an external source is quite remote. Therefore, the test pulses are analyzed for what is, in effect, their unique signature. It may be noted that if the first channel to respond is the X-channel, then the two antennas are wired correctly. However, if the first channel to respond is the Y-channel, then an indication that the antennas are wired backwards is present. Correction in software can then be made.

This program starts as a labelled "Background Signal Test Generator" routine, as represented at block 400. The program then progresses to the activity represented at block 402 calling for the generation of a bipolar signal. This signal goes initially positive and then negative, the instruction at block 402 requiring that the initial pulse be positive for one axis or the X-channel only. Then, as represented at block 404, a delay of 15 microseconds is developed whereupon the bipolar signal for the opposite axis or the Y-channel is developed. The test signals of this test procedure are selected as being large enough to test the full dynamic range both of the amplification stages and the analog-to-digital converters as at 154 and 158. Additionally, the slope of the test signals are determined. This slope determination permits the system to evaluate the bandwidth of a given channel. In particular, the slew rate of the signal permits identification as to whether the bandwidths and phase are correct. It is important that the test procedure have a high probability for detecting any error in the system. Thus, it is somewhat involved. Accordingly, the test inquires well beyond the presence or absence of a signal but to what form of signal is received. It may be observed that the acquisition of the test waveform data is in the same manner as the acquisition of data emanating from lightning strikes during non-test performance of the system. Verification also is made of gain and phase for each of the channels X and Y. The resultant data are placed in memory for further evaluation.

The program then continues to decision block 408. The inquiry at block 408 asks whether the test signal has been received in the X-channel first. If not, as represented at line 410 and block 412, the X- and Y-channels are reversed and the program continues, as represented at lines 414 and 416. In the event of an affirmative determination, the program continues, as represented at line 416, to the inquiry represented at block 418. This inquiry determines whether the X-channel pulse is positive first. If it is not, then the wiring into the X-channel is reversed and, as represented at line 420 and block 422, the X-channel polarity is reversed in software. The program then continues, as represented at lines 424 and 426. Where the X-pulse is positive first, then, as represented by line 426 and block 428, a determination is made as to whether the Y-pulse is positive first. In the event that it is not, then, as represented at line 430 and block 432, the Y polarity is reversed in software and the program continues, as represented at lines 434 and 436. Where the inquiry at block 428 is in the affirmative, then the program continues, as represented at line 436. The inquiries at blocks 418 and 428 provide a set of decisions and related activities which, in effect, rewire the instrument if necessary. A next determination is developed in conjunction with block 438 wherein a determination as to whether the polarity is correct. This is derived through the imposition of a test signal upon the polarity sensor 48 as developed through capacitor C10 and line 46 described in conjunction with FIG. 11. The polarity sensor is energized with one polarity during one test occurrence and then is energized with the next polarity in a next subsequent test. In the event of an affirmative response, then, as represented at line 440 and block 442, all remaining tests then are evaluated for correctness. These tests include bandwidth evaluation, gain evaluation, and phase evaluation which cannot be contemplated until the inquiries relating to proper configuration of the system are carried out and corrections are made. In the general sequence of events with the test procedure, a test pulse is scheduled by scheduler function 380 and a test pulse then is generated. The test pulse triggers the acquisition system in the same manner as the response to a lightning strike. The acquisition system then responds to the scheduler 380 to the effect that data are available. This information then is correlated with the information that a test is under way. An analysis then is made in the instant test mode.

In the event that all tests are correct, then, as represented at line 444 and block 446, the test pulse phase is inverted for the next test to be carried out. This permits a test of both polarities of the polarity testing plate of the sensor function 58. Note, that if the tests are correct, the phase is inverted. If the tests are not correct, the phase is not inverted to provide further test control logic. Accommodation is additionally made inasmuch as the test for polarity may coincide with the lightning strike. Subsequent testing will effectively then re-evaluate this function. If all testing shows the instrument to be in order, then, as represented at block 448, a test is scheduled to reoccur in one minute. In the event of test failure, as represented at lines 450, 452, and block 454, the system continues to try the test and, in the event of failure, a predetermined number of times, for example, 8 times, then an error signal is published at the display.

Figure 14:
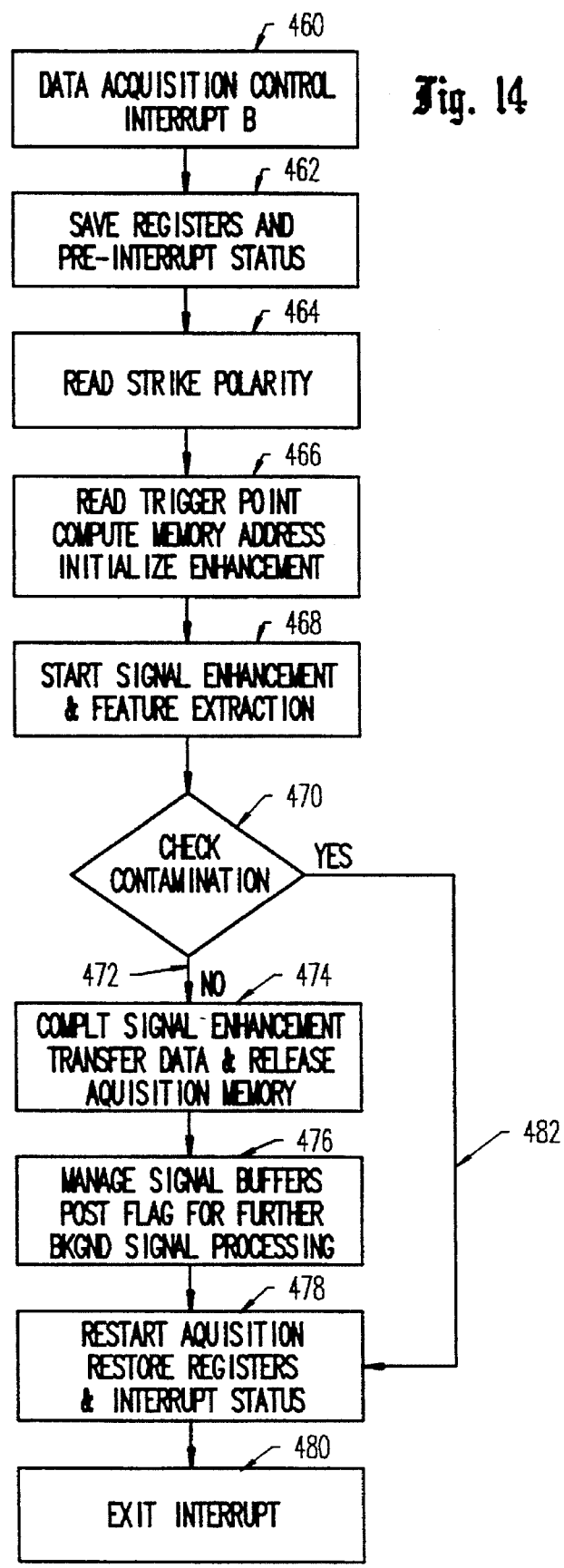
FIG. 14 is a flow diagram showing a data-acquisition control interrupt activity.

Turning to FIG. 14, an interrupt driven control feature is illustrated in block diagrammatic form. This interrupt, arbitrarily designated "Interrupt B" occurs where data are present and are to be acted upon. Thus, the start of this program is represented as a "Data Acquisition Control". A first step in conjunction with such an interrupt commenced activity is to save existing data and, as represented at block 462, the registers and interrupt status of the control system are saved. The program then progresses, as represented at block 464. Instructions represented with this block provide for the reading of strike polarity, which generally will have been developed in conjunction with the status of a flip-flop component or the like. Then, as represented at block 466, the trigger point is read. The acquisition memory 178 is, in effect, a circular buffer responding to what is a continuously flowing stream of data from the analog-to-digital converters as at 154 and 158. It is necessary to identify a data starting point or trigger. Thus, there is an association between the microprocessor function 132 and the acquisition hardware for developing a memory address. In effect, when the acquisition function stops and an address is read, 512 samples will have occurred subsequent to a trigger. That data are read to memory, inasmuch as the acquisition hardware must be started again for a next sequence. The program then continues to the activities represented at block 468 wherein signal enhancement is commenced. This enhancement serves to increase the dynamic range and precision of the measurement system by carrying out calculations intended to identify or separate valid data from noise. The goal at this juncture is to reach a point where it is ascertained that the data are good or are invalid. Invalid data are discarded quickly, such that as little investment as possible is made in analyzing invalid data. The feature extraction component of this activity is one wherein certain special features of the incoming signals are looked for, such as amplitude and wave shape. By testing with respect to such features, 70% to 80% of erroneous data such as noise developed from strobe devices, servo motors, and the like can be discarded. As is apparent, the instrumentation must meet the challenge of dealing with a wide range of noise as well as valid signals. The program then continues to the decision represented at block 470 wherein a determination is made as to whether the waveform or data at hand has the attributes of a lightning strike or the attributes of signals not representing a lightning strike. Such determination is made as a check for contamination. Where a determination is made that lightning strike derived data are at hand, then, as represented at line 472 and block 474, an activity ensures which provides for the completion of signal enhancement and the transfer of data to data memory. As long as that waveform is in acquisition memory 178, the acquisition system cannot be reactivated to receive more data without losing the data now at hand. Thus, the transfer is made and the acquisition memory is released.

These data will have a very high probability of being valid. Time is now taken to complete signal enhancement in conjunction with the data now placed in data memory. The program then continues to block 476 wherein activities for the management of signal buffers are carried out. For example, the system will buffer numerous lightning strikes. In this regard, if the system is calculating data with respect to a given lightning strike and a next strike occurs, the data corresponding with that next strike are saved and the system then returns to carry on the original calculations. A sequence of lightning strikes all will be captured and processing will be postponed. Thus, antenna activity is designated as having a higher priority than calculations made with respect to previous data. Generally, lightning strike evolved data will occur in clusters followed by intervals of silence. In effect, the peak data rate evidenced with lightning strike clusters will be higher than the calculating speed of the computational systems, however, that system will accommodate an average of that rate of data acquisition. Buffering accommodates for this situation. Generally, data representing about six strikes may be buffered with this feature. Typically two or three bufferings are carried out in the operation of the system. In conventional manner, flags are posted for further background signal processing following the acquisition procedure.

At this point in time, the acquisition memory will have been freed or made available, data having been copied elsewhere and, as represented at block 478, the acquisition system is restarted, the registers and interrupt status being restored. The interrupt then is exited, as represented at block 480. Where the determination at decision block 470 is in the affirmative that contamination is present, then, as represented by line 482 and block 478, the acquisition system is restarted and registers and interrupt status are restored.

Figure 15:
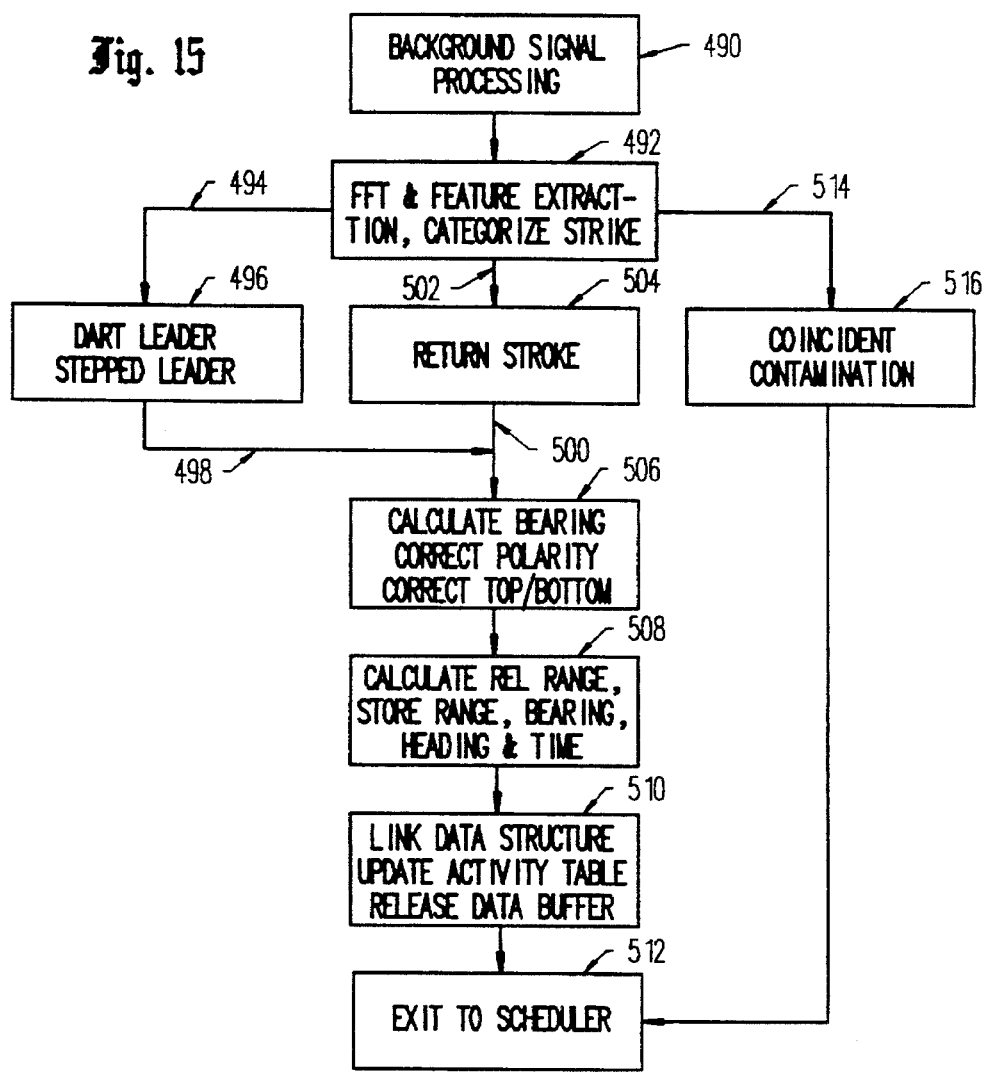
FIG. 15 is a flow chart showing a background signal processing activity.

Referring to FIG. 15, the background signal processing features of the control system are described in flow diagrammatic fashion. In general, a determination will have been made by the system at this point as to whether a test is under way, or as to whether the data acquired emanates from a lightning strike. The present control features are concerned with the latter condition. Entry into the activity is represented at block 490 and will have been ultimately commenced or triggered by an acquisition interrupt evidenced by the posting of a flag for further background signal processing as discussed in connection with block 476 of FIG. 14. The latter flag is checked by the scheduler 380 which determines that background signal processing should be carried out. At this point in time, data are present in data memory 200 which will be a processed waveform from both the X and Y channels. As represented at block 492, a Fourier transform is carried out and various features are looked for as developed from this transform activity. Generally, the Fourier transform (FFT) will provide frequency information with respect to amplitude as well as phase information. A variety of FFT or equivalent techniques may be employed for this purpose. Certain characteristics will permit an identification as to the form of strike under evaluation. In particular, it may be determined as to whether the data represents a leader or a return stroke. The leader phenomenon is a form of a primer exhibiting a very brief duration, low amplitude signal ionization path. Termed a "dart" leader, it will occur prior to a full lightning strike. Very often, the dart leader occurs from cloud to ground and serves as the initial ionization path for conduction to occur, for example from ground to cloud. Generally, the dart leader will exhibit a higher percentage of higher frequencies. By contrast, the return stroke contains a greater quantity of lower frequencies and typically will exhibit a much higher in amplitude. Accordingly, activities which ensue following categorization may be represented by line 494 and block 496 wherein a dart leader is identified and the activity continues, as represented by lines 498 and 500. On the other hand, the categorization may be that of a return stroke as represented by line 502 and block 504. Line 500 is seen to lead to the activities represented at block 506 which include the calculation of the bearing of the strike which is based upon the magnitude of the signals invoked in coils 24 and 46. Polarity correction is provided in conjunction with the information from the polarity sensor 48 and top/bottom correction is made with respect to the orientation of the sensor unit 10 in conjunction with the output of the gravity or mercury switch 54. The polarity correction provides for a 180° adjustment to the computations.

The activities then continue, as represented at block 508, wherein a relative range value is calculated. This value is a number used later to develop a more precise range which ultimately is displayed. It, in effect, represents a first derived value for that parameter. This relative range then is stored as well as the bearing of the strike, the aircraft heading and the time of strike occurrence. Time data are developed in conjunction with the commencement of activity or start-up of the system and provide information as to how far back in time, for example, strike data will have occurred for utilization and evaluation of the earlier-noted time travel feature. Additionally, data at the display is caused to disappear after a certain period of time, inasmuch as it will no longer be useful. Generally, this timing is to an accuracy of about 1,000th of a second. The activities then progress, as represented at block 510, to carry out linking of the data structure. This, in effect, is a data tracking activity wherein, for every strike, the data stored in memory are so stored with appropriate pointers, linking, indexing and the like. The "Update active table" function is one wherein the storm characteristics at various places or locations in the sky are monitored. This monitoring is carried out in a table update form of processing activity. At this juncture, the lightning strike will have been analyzed, buffered, and the data represented by it appropriately treated and linked into the data memory structure. The buffer area is no longer required for the instant data and thus, is released for response to the next lightning strike occurring. As represented at block 512, a return is made to the scheduler 380.

Returning to block 492, the categorization of the strike may, as represented at line 514 and block 516, indicate that coincident contamination is at hand. With that categorization, as represented at line 518, the activity exits to return to the scheduler 380. In general, coincident contamination is a phenomenon wherein two lightning strikes occur simultaneously in different parts of the same storm. Unless it is dealt with as shown, in view of the 80 microsecond window of evaluation, in effect, a blizzard of pixels will occur at the display having no value to the aircraft pilot.

Figure 16:
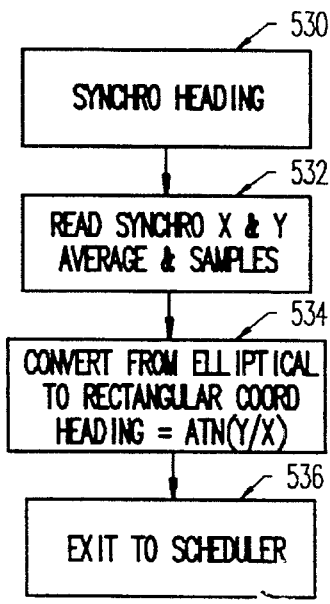
FIG. 16 is a block diagram showing the activities associated with a synchro-heading input to a control system.

Looking to FIG. 16, activities representing the development of heading information from, for example, a rotary transformer form of compass is described. In particular, at block 530, this activity is entered with respect to the earlier-described "synchro" heading developed from some compass systems. Generally two 400 Hz outputs are evolved, the amplitudes of which vary upon the angle which the device is oriented to. As represented at block 532, the X- and Y-synchro outputs are read, digitized, and averaged over 8 samples for the purpose of removing noise. As represented at block 534, the data are converted from elliptical to rectangular coordinates inasmuch as the data as acquired will be based upon a 120° aspect and the conversion provides the data with respect to a 90° reference. The heading then becomes the arctangent of the X and Y coordinate signals. As represented at block 536, the activity then exits to the scheduler management. Other heading sources may be stepper motor derived in response to gyro-originated heading data and the like. Another heading source may be derived from typical Loran track outputs. This can be inserted into the system through an RS 232 connection. The update rate from the systems is generally adequate to provide useful data.

Figure 17:
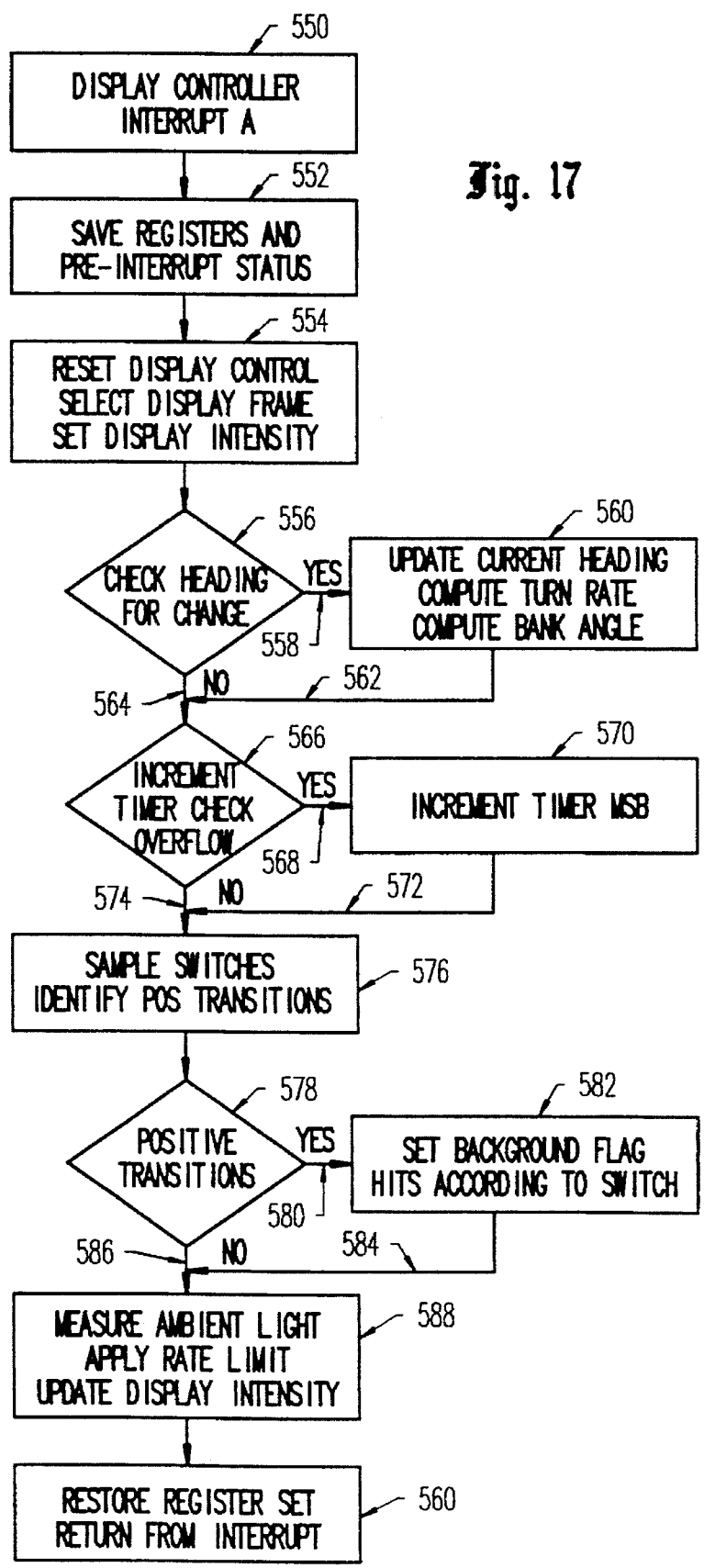
FIG. 17 is a flow diagram of a display controller interrupt-based activity.

The display or readout is updated at a 76 Hz rate. This update activity occurs in conjunction with an interrupt designated "interrupt A", as represented at block 550 in FIG. 17. Looking to that figure, the interrupt activity commences with the saving of registers and pre-interrupt status of the system, as represented at block 552. The activity then progresses, as represented at block 554, to reset the display control and, select a display frame. In general, the display memory 218 will be formed of two groups of two pages of the frames and a pixel selection may be positioned on one or both of such pages. Different intensities of the pixel output or the modulation thereof may be developed by locating this pixel on one or both of the pages of frames. In general, one such memory frame is being updated while the data of the other is being displayed. The reset feature described in the block is representative of the commencement of update. In general, display intensity is based upon the interval at which a given pixel is energized. Selection of intensity is based upon the cabin ambient illumination intensity as monitored by photocell 307 described in conjunction with FIG. 10. The activity then continues, as represented by decision block 556 wherein a determination is made as to whether a substantial heading change is under way. In the event that it is, then, as represented at line 558 and block 560, the current heading is updated and bank angle and turn rate are computed. Thus, distortion resulting from the turning activity of the aircraft is corrected. The program then continues, as represented at lines 562 and 564. Where no heading change is at hand, then the program also continues, as represented at line 564 to the inquiry at block 566. Here, the general system timer is incremented and a check is made as to whether an overflow condition is at hand with respect to it. In the event of an affirmative determination at block 566, then, as represented by line 568 and block 570, the most significant byte is incremented and the program continues, as represented at lines 572 and 574. Line 574 also indicates no overflow condition is at hand, and leads to the activity represented at block 576. This activity involves the sampling of switches S1–S4 and identifying a positive transition of them. The latter transition is the only one acted upon by the system. Accordingly, as represented by decision block 578, where a positive transition, representing a button push, is present, then, as represented by line 580 and block 582, background flag bits are set in accordance with the switch actuated, thus providing appropriate information as to that fact to the scheduler 380. The program then continues, as represented at lines 584 and 586. Block 588 describes that the ambient light is measured by the photocell 307 and display intensity is updated. This update activity occurs each half second. The application of a rate limit provides that the update occurs only by one brightness step. This accommodates for transient interruptions of the light input to the photocell as may occur by the movement of a hand or the like in the aircraft cabin or the like. The interrupt program then exits with the restoration of the register sets, as represented at block 560.

Since certain changes may be made in the above system, method and apparatus without departing from the scope of the invention herein involved, it is intended that all matter contained in the above description or shown in the accompanying drawings shall be interpreted as illustrative and not in a limiting sense.

I claim:

1. The method for locating the site of a lightning occurrence with respect to a heading axis, said lightning occurrence evoking an electromagnetic field including an H-field component and an E-field component, comprising the steps of:

providing a first H-field antenna including a first coil structure having a first array of windings oriented at a select angle with respect to said heading axis and deriving a first response to said H-field component;

providing a second H-field antenna including a second coil structure having a second array of windings orthogonally disposed with respect to said first array and deriving a second response to said H-field component;

converting said first and second response to X-channel and Y-channel binary numerical values;

acquiring said binary numerical values in memory;

accessing said memory for said binary numerical values;

treating said accessed binary numerical values to derive bearing and range information corresponding with said lightning occurrence; and publishing said bearing and range information as a visually perceptible readout.

2. The method of claim 1 wherein said select angle of said first array of windings is about 45°.

3. The method of claim 1 in which:

said first response is derived as a first current specific response; and said second response is derived as a second current response.

4. The method of claim 3 in which said first and second current specific responses are derived by the inductive coupling of the primary winding of first and second transformers with respect to said first and second coil structures.

5. The method of claim 1 including the steps of:

acquiring the bearing of said heading axis as the positioned response of a compass gyroscope controlled stepper motor; and said step treating of said accessed binary values is carried out in correspondence with said acquired bearing positional response.

* * * * *